United States Patent
Wang

(10) Patent No.: US 11,724,968 B2
(45) Date of Patent: Aug. 15, 2023

(54) SHELL AND PROCESSING METHOD OF SHELL

(71) Applicant: BEIJING XIAOMI MOBILE SOFTWARE CO., LTD., Beijing (CN)

(72) Inventor: Yukun Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 629 days.

(21) Appl. No.: 16/737,518

(22) Filed: Jan. 8, 2020

(65) Prior Publication Data

US 2021/0070665 A1    Mar. 11, 2021

(30) Foreign Application Priority Data

Sep. 6, 2019   (CN) .......................... 201910843339.0

(51) Int. Cl.
| | |
|---|---|
| C04B 41/00 | (2006.01) |
| C04B 38/00 | (2006.01) |
| C04B 41/45 | (2006.01) |
| C04B 35/64 | (2006.01) |
| C04B 35/624 | (2006.01) |
| B01J 13/00 | (2006.01) |
| C04B 41/88 | (2006.01) |

(52) U.S. Cl.
CPC .......... *C04B 41/009* (2013.01); *B01J 13/0013* (2013.01); *C04B 38/0045* (2013.01); *C04B 38/0051* (2013.01); *C04B 41/4543* (2013.01); *C04B 41/88* (2013.01); *C04B 2237/55* (2013.01)

(58) Field of Classification Search
CPC .......... C04B 38/0045; C04B 2237/597; C04B 41/4537; C04B 35/64
See application file for complete search history.

(56) References Cited

U.S. PATENT DOCUMENTS

| | | | | |
|---|---|---|---|---|
| 5,858,457 | A * | 1/1999 | Brinker ............... | B01J 29/0308 |
| | | | | 427/430.1 |
| 2003/0151173 | A1* | 8/2003 | Wang .................. | C01B 33/158 |
| | | | | 264/621 |
| 2019/0071369 | A1 | 3/2019 | Chang et al. | |
| 2020/0001499 | A1 | 1/2020 | Zheng et al. | |

FOREIGN PATENT DOCUMENTS

| | | |
|---|---|---|
| CN | 101066861 A | 11/2007 |
| CN | 101234296 A | 8/2008 |
| CN | 103408330 A | 11/2013 |
| CN | 106911824 A | 6/2017 |

(Continued)

OTHER PUBLICATIONS

CN 109093926 A (Kong) Dec. 28, 2018 (English language machine translation). [online] [retrieved Nov. 2, 2022]. Retrieved from: Espacenet. (Year: 2018).*

(Continued)

*Primary Examiner* — Erin Snelting
(74) *Attorney, Agent, or Firm* — Arch & Lake LLP

(57) ABSTRACT

A shell and a method for processing the shell are provided. The method includes: coating a sol prepared in advance on an inner surface of a ceramic shell prepared in advance; sintering the ceramic shell coated with the sol by using a sintering process, and forming a transition layer having nano-sized micro-pores on the inner surface of the ceramic shell.

7 Claims, 3 Drawing Sheets

(56) References Cited

FOREIGN PATENT DOCUMENTS

| | | | |
|---|---|---|---|
| CN | 107127863 A | 9/2017 | |
| CN | 107580097 A | 1/2018 | |
| CN | 107686379 A | 2/2018 | |
| CN | 108189444 A | 6/2018 | |
| CN | 108202440 A | 6/2018 | |
| CN | 108407164 A | 8/2018 | |
| CN | 109093926 A | 12/2018 | |
| EP | 0413033 A1 | 2/1991 | |
| JP | 10212174 A * | 8/1998 | ........... C04B 35/481 |
| WO | 2014153955 A1 | 10/2014 | |

OTHER PUBLICATIONS

JP H10-212174 A (Oshima) Aug. 11, 1998 (English language machine translation), [online] [retrieved Nov. 11, 2022], Retrieved from: Espacenet. (Year: 1998).*
Extended European Search Report in the European Application No. 20150852.0, dated Jul. 2, 2020, (7p).
First Office Action of the Chinese Application No. 201910843339.0, dated Mar. 3, 2022, (14p).
First Office Action of the European Application No. 20150852.0, dated Jun. 21, 2023, (6p).

* cited by examiner

Adding a sol precursor into water in several times, and obtaining a suspension-like liquid containing a hydrolyzed precipitate at a bottom thereof in a heating reflux manner — 201

Adding a strong acid into the suspension-like liquid in several times and obtaining clarified sol in the heating reflux manner — 202

Coating the sol prepared in advance on the inner surface of the ceramic shell by using any of the following coating methods or a combination thereof: dip-coating, casting, spin-coating and spraying — 203

Sintering the ceramic shell coated with the sol by using a sintering process, and forming a transition layer having nano-sized micro-pores on the inner surface of the ceramic shell — 204

Connecting the ceramic shell and a plastic part through the transition layer by bonding or injection molding to obtain a target shell — 205

FIG. 2

SHELL AND PROCESSING METHOD OF SHELL

CROSS-REFERENCE TO RELATED APPLICATIONS

The present application is based upon and claims priority to Chinese Patent Application No. 201910843339.0, filed on Sep. 6, 2019, the entire contents of which are incorporated herein by reference.

TECHNICAL FIELD

The present disclosure relates to the technical field of terminals, and more particularly to, a shell and a processing method of the shell.

BACKGROUND

Smart phones have gained popularity in the last decade. Materials of shells for mobile phones have been changed dramatically, from plastics to new-generation materials such as metallic glass. However, as the differentiation of mobile phone hardware is not obvious, innovations of materials have become one of the main ways for terminal manufacturers to avoid the serious homogenization of the smart phones. Common materials of shells for mobile phones include plastics, metals, glasses, ceramics, woods, leathers etc. Different physical properties of these materials give rise to distinct look and feel of the manufactured mobile phones.

In related arts, as the ceramic material has higher hardness than the glass, is more scratch-resistant and wear-resistant, is unique in crystal clear look, and is low in interference on high-frequency signals, ceramic shells made of ceramic materials are highly desired by terminal manufacturers and users. However, ceramic materials are expensive and heavy in weight, and it is difficult to manufacture a buckle and a middle frame connection within a ceramic shell. It is desirable to produce a thin ceramic layer combined with a plastic or fiber board, in order to manufacture a light-weight shell for cell phones.

SUMMARY

For solving the problem existing in the related art, embodiments of the present disclosure provide a shell and a processing method of the shell. The technical solution is as follows.

According to an aspect of the present disclosure, a method of processing a shell for a terminal is provided, the processing method including: coating a sol prepared in advance on an inner surface of a ceramic shell prepared in advance with a sol prepared in advance; sintering the ceramic shell coated with the sol by using a sintering process, forming a transition layer having with nano-sized micro-pores on the inner surface of the ceramic shell, and connecting the ceramic shell and to a plastic part through the transition layer to obtain a target shell.

According to a second aspect of the present disclosure, a shell for a terminal is provided. The shell is produced by using the steps of the method in the above first aspect, and the shell includes: a ceramic shell having an inner surface that is coated with a sol prepared in advance; a transition layer comprising nano-sized micro-pores disposed on the inner surface of the ceramic shell, wherein the transition layer is formed by sintering the ceramic shell coated with the sol; and a plastic part connected with the ceramic shell through the transition layer.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 2 is a flow chart showing a processing method of a shell illustrated according to an exemplary embodiment.

DETAILED DESCRIPTION

Figure 1:
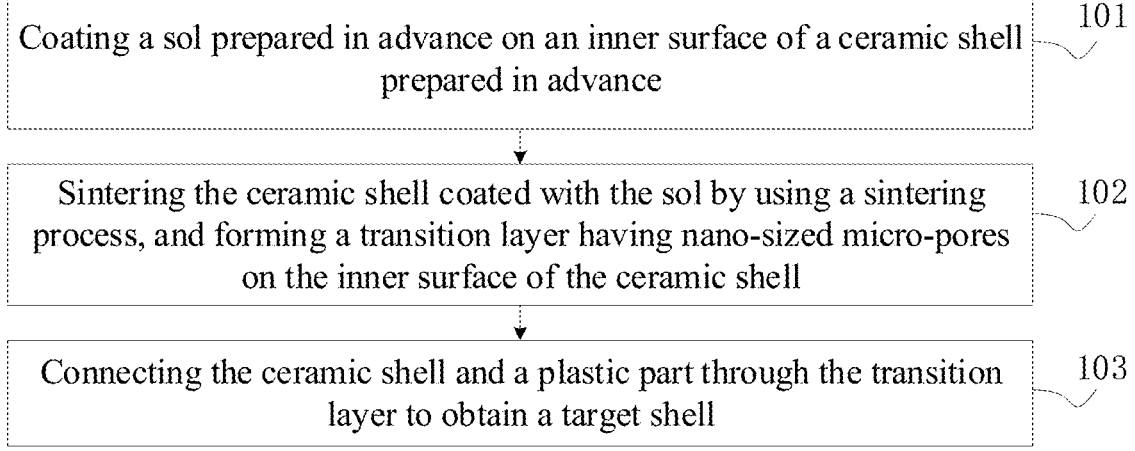
FIG. 1 is a flow chart showing a processing method of a shell illustrated according to an exemplary embodiment.

Reference will now be made in detail to exemplary embodiments, examples of which are illustrated in the accompanying drawings. The following description refers to the accompanying drawings in which the same reference numeral in different drawings represents the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In a related art, many manufacturers utilize ceramic materials to manufacture a mobile phone. However, since the ceramic surface is smooth after mold pressing and sintering, the surface tension is smaller than that of commonly used plastics, during bonding or injection molding, the ceramic surface is dependent on the electrochemical surface treatment to improve the surface bonding, and the bonding between the ceramic and the plastic parts is weak. Since the working procedure and production energy consumption are increased, the structural design of the ceramics on mobile phone products is limited to some extent.

To solve the above problem, the embodiments of the present disclosure provide a processing method of the shell. The method includes: coating a sol prepared in advance on an inner surface of a ceramic shell prepared in advance; sintering the ceramic shell coated with the sol by using a sintering process, and forming a transition layer having nano-sized micro-pores on the inner surface of the ceramic shell; connecting the ceramic shell and a plastic part through the transition layer to obtain a target shell.

By adopting the technical solution provided by the embodiments of the present disclosure, the sol is coated on the surface of the ceramic shell and the transition layer having nano-sized micro-pores is formed on the inner surface of the ceramic shell by using a low-temperature sintering process. Therefore, mechanical anchor points are provided for combination of the ceramic and the plastic part, the mechanical lock effect is formed, the bonding between the ceramic and the plastic part is improved. In addition, the process of connecting the ceramic and the plastic part does not require special surface treatment on the ceramic surfaces, thereby reducing the processing procedure of the ceramic shell, reducing the production energy consumption and being simple to operate. The technical solution may be applied to conventional engineering plastics or rubbers. The design space of ceramic and plastic material selection is greatly expanded; the transition layer does not affect the polish or glaze decoration of the outer surface of the ceramic shell. The target shell in the present disclosure may be applied to user equipment such as a mobile phone, a tablet computer or wearable equipment.

On the basis of the above analysis, the embodiments of the method of the present disclosure are introduced below.

FIG. 1 is a flow chart showing a processing method of a shell illustrated according to an exemplary embodiment. As shown in FIG. 1, the method includes the following steps 101-103.

In step 101, a sol prepared in advance is coated on an inner surface of a ceramic shell prepared in advance.

In an example, a component of the sol includes metal elements such as Al, Zr or Zn, and the sol contains a sol complex salt produced by hydrolysis of sol precursor. The component of the ceramic shell includes, but is not limited to, metal oxide ceramics such as aluminum oxide, zirconium oxide or zinc oxide. Optionally, in order to ensure good chemical compatibility and cross-section compounding property between the sol and the ceramic shell, the components of the sol and the ceramic shell generally contain the same metal element.

In an example, before the sol prepared in advance is coated on the inner surface of the ceramic shell prepared in advance, the sol needs to be prepared. A method for preparing the sol may include: adding the sol precursor into water in several times, and obtaining a suspension-like liquid in a heating reflux manner, and the suspension-like liquid contains a hydrolyzed precipitate at a bottom of the suspension-like liquid, herein the sol precursor includes a hydrolyzed basic salt precipitate containing the metal elements such as Al, Zr or Zn; and adding a certain amount of strong acid into the suspension-like liquid in several times and obtaining an uniformly clarified sol in the heating reflux manner. Optionally, the strong acid added into the suspension-like liquid is used as a sol agent, and the specific type of strong acid depends on the component of the sol precursor.

In an example, coating the sol prepared in advance on the inner surface of the ceramic shell includes: coating the sol prepared in advance on the inner surface of the ceramic shell by using any of the following coating methods or a combination thereof: dip-coating, casting, spin-coating and spraying.

In step 102, the ceramic shell coated with the sol is sintered by using a sintering process, and a transition layer having nano-sized micro-pores is formed on the inner surface of the ceramic shell.

In an example, the ceramic shell coated with the sol is kept in a dust-free environment for a preset time period, and then placed in a sintering furnace for sintering treatment; herein, a sintering temperature ranges from 660 degrees centigrade to 850 degrees centigrade, and a heat preservation time is at least 1 hour. For example, the preset time period may be between 1 hour and 6 hours, or more preferably between 2 hours and 5 hours. Optionally, the sintering temperature is 780 degrees centigrade, the heat preservation time is 1 hour, the preset time period is 4 hours and a temperature raise rate is 2 degrees centigrade/min. The sintering temperature is lower than the sintering temperature during manufacture of the ceramic shell.

In an example, the transition layer includes a mesoporous structure or a microporous structure. Since the components of the sol and the ceramic shell contain the same metal element, the ceramic shell and the transition layer are less prone to cracking or transition layer peeling caused by the difference in thermal expansion coefficient in a sintering procedure.

In step 103, the ceramic shell is connected with a plastic part through the transition layer to prepare or obtain a target shell.

In an example, the process of connecting the ceramic shell and the plastic part through the transition layer to prepare or obtain the target shell includes: connecting the ceramic shell and the plastic part through the transition layer by bonding or injection molding to obtain the target shell.

In an example, the material of the plastic part may include: plastics or rubbers such as polycarbonate (PC), polymethyl methacrylate (PMMA), acrylonitrile-butadiene-styrene copolymer (ABS), polyamide (PA), polybutylene terephthalate (PBT), polyethylene terephthalate (PET), nitrile rubber, or glass fiber/basalt fiber/carbon fiber composite board.

According to the technical solution provided by the embodiments of the present disclosure, the sol is coated on the surface of the ceramic shell and the transition layer having nano-sized micro-pores is formed on the inner surface of the ceramic shell by using a low-temperature sintering process. Therefore, mechanical anchor points are provided for combination of the ceramics and the plastic part, the mechanical lock effect is formed, the bonding between the ceramic and the plastic part is improved. In addition, the process of connecting the ceramic and the plastic part does not require special surface treatment on the ceramic surfaces, thereby reducing the processing procedure of the ceramic shell, reducing the production energy consumption and being simple to operate. The technical solution may be applied to conventional engineering plastics or rubbers. The design space of ceramics and plastic material selection is greatly expanded; the transition layer does not affect the polish or glaze decoration of the outer surface of the ceramic shell.

FIG. 2 is a flow chart showing a processing method of a shell illustrated according to an exemplary embodiment. As shown in FIG. 2, on the basis of the embodiment shown in FIG. 1, the processing method of the shell involved in the present disclosure includes the following steps 201-205.

In step 201, a sol precursor is added into water in several times, and a suspension-like liquid is obtained in a heating reflux manner, and the suspension-like liquid contains a hydrolyzed precipitate at a bottom of the suspension-like liquid.

In an example, the sol precursor contains a hydrolyzed basic salt precipitate containing metal elements such as Al, Zr or Zn. The component of the ceramic shell includes, but is not limited to, metal oxide ceramics such as aluminum oxide, zirconium oxide or zinc oxide; the components of the sol and the ceramic shell contain the same metal element. The sol precursor is added into the water in several times, and heated at a certain temperature and refluxed with water vapor to obtain a suspension-like liquid containing a hydrolyzed precipitate at the bottom of the suspension-like liquid. Optionally, the ceramic material of the ceramic shell is aluminum oxide ceramic, and aluminum isopropoxide is a hydrolysis precursor.

In step 202, a strong acid is added into the suspension-like liquid in several times, and clarified sol is obtained in the heating reflux manner.

In an example, the strong acid is added into the above liquid in several times and continuously heated and refluxed until the solution becomes the uniformly clarified sol.

In step 203, the sol prepared in advance is coated on the inner surface of the ceramic shell by using any of the following coating methods or a combination of thereof: dip-coating, casting, spin-coating and spraying.

In step 204, the ceramic shell coated with the sol is sintered by using the sintering process and the transition layer having nano-sized micro-pores is formed on the inner surface of the ceramic shell.

In an example, the ceramic shell coated with the sol is kept in a dust-free environment for a period of time to obtain the ceramic shell including the transition layer having nano-sized micro-pores on the surface.

In step 205, the ceramic shell is connected with the plastic part through the transition layer by bonding or injection molding to obtain the target shell.

According to the technical solution provided by the embodiments of the present disclosure, the sol is coated on the surface of the ceramic shell and the transition layer having nano-sized micro-pores is formed on the inner surface of the ceramic shell by using a low-temperature sintering process. Therefore, mechanical anchor points are provided for combination of the ceramics and the plastic part, the mechanical lock effect is formed, the bonding between the ceramics and the plastic parts is improved. In addition, the process of connecting the ceramics and the plastic parts does not require special surface treatment on the ceramic surfaces, thereby reducing the processing procedure of the ceramic shell, reducing the production energy consumption and being simple to operate. The technical solution may be applied to conventional engineering plastics or rubbers. The design space of ceramic and plastic material selection is greatly expanded; the transition layer does not affect the polish or glaze decoration of the outer surface of the ceramic shell.

Figure 3:
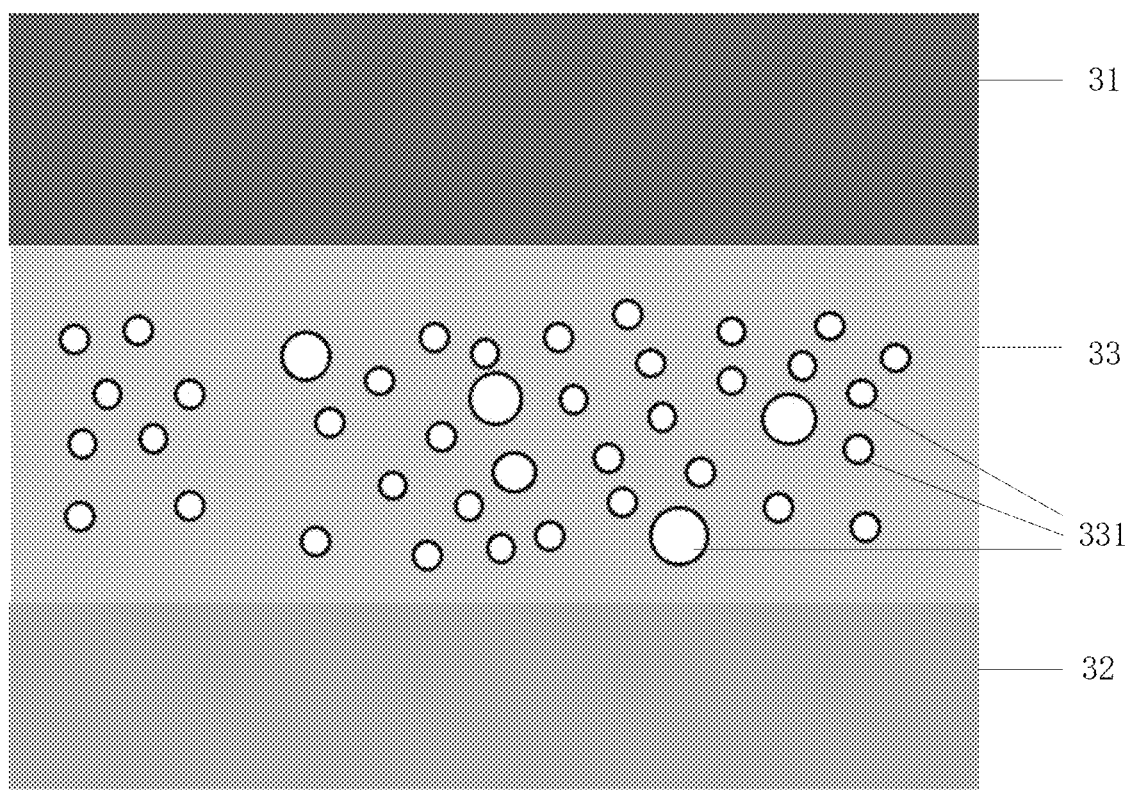
FIG. 3 is a diagrammatic cross section showing a shell illustrated according to an exemplary embodiment.

FIG. 3 is a diagrammatic cross section showing a shell illustrated according to an exemplary embodiment. The shell in FIG. 3 is produced by using the steps of the processing method of the shell provided by any of the method embodiments of the present disclosure. As shown in FIG. 3, the shell includes:

a ceramic shell 31 and a plastic part 32; herein, an inner surface of the ceramic shell 31 is provided with a transition layer 33 having nano-sized micro-pores 331; the ceramic shell 31 is connected with the plastic part 32 through the transition layer 33.

In an example, the transition layer 33 includes a mesoporous structure or a microporous structure.

In an example, the ceramic shell 31 is connected with the plastic part 32 through the transition layer 33 by bonding or injection molding.

According to the technical solution provided by the embodiments of the present disclosure, the sol is coated on the surface of the ceramic shell and the transition layer having nano-sized micro-pores is formed on the inner surface of the ceramic shell by using a low-temperature sintering process. Therefore, mechanical anchor points are provided for combination of the ceramics and the plastic part, the mechanical lock effect is formed, the bonding between the ceramics and the plastic parts is improved. In addition, the process of connecting the ceramics and the plastic parts does not require special surface treatment on the ceramic surfaces, thereby reducing the processing procedure of the ceramic shell, reducing the production energy consumption and being simple to operate.

Other implementation solutions of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for processing a shell of a terminal, comprising:
   coating an inner surface of a ceramic shell with a sol prepared in advance;
   sintering the ceramic shell coated with the sol, to form a transition layer with nano-sized micropores on the inner surface of the ceramic shell; and
   connecting the ceramic shell to a plastic part through the transition layer to obtain a target shell,
   wherein sintering the ceramic shell coated with the sol comprises:
   keeping the ceramic shell coated with the sol in a dust-free environment for a preset time period, and then placing the ceramic shell in a sintering furnace for sintering treatment.

2. The method of claim 1, wherein the sol comprises any one or a combination of the following elements: Al, Zr, or Zn.

3. The method of claim 1, wherein the ceramic shell comprises any one or a combination of the following materials: aluminum oxide, zirconium oxide, or zinc oxide.

4. The method of claim 1, wherein before coating the inner surface of the ceramic shell with the sol prepared in advance, the method further comprises:
   adding a sol precursor into water, and obtaining a suspension liquid in a heating reflux manner, wherein a hydrolyzed precipitate is contained in a bottom of the suspension liquid; and
   adding a strong acid into the suspension liquid, and obtaining clarified sol in the heating reflux manner.

5. The method of claim 1, wherein coating the sol prepared in advance on the inner surface of the ceramic shell comprises:
   coating the sol prepared in advance on the inner surface of the ceramic shell by using any one or a combination of the following coating methods: dip-coating, casting, spin-coating, and spraying.

6. The method of claim 1, wherein
   a sintering temperature for the sintering treatment ranges from 660 degrees centigrade to 850 degrees centigrade, and a heat preservation time for the sintering treatment is at least 1 hour.

7. The method of claim 1, wherein connecting the ceramic shell to the plastic part through the transition layer to obtain the target shell comprises:

connecting the ceramic shell to the plastic part through the transition layer by bonding or injection molding to obtain the target shell.

* * * * *